(12) United States Patent
Zhang et al.

(10) Patent No.: US 12,028,944 B2
(45) Date of Patent: Jul. 2, 2024

(54) METHOD FOR CONTROLLING BLEEDER CONNECTED TO PHASE-CUT DIMMER AND CIRCUIT CONNECTED TO PHASE-CUT DIMMER

(71) Applicant: Delta Electronics (Shanghai) Co., Ltd., Shanghai (CN)

(72) Inventors: Xinghua Zhang, Shanghai (CN); Yugang Bao, Shanghai (CN); Xiaoping Fu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/823,965

(22) Filed: Sep. 1, 2022

(65) Prior Publication Data

US 2023/0209670 A1    Jun. 29, 2023

(30) Foreign Application Priority Data

Dec. 29, 2021 (CN) .......................... 202111640638.8

(51) Int. Cl.
 *H05B 45/14* (2020.01)
 *H05B 45/31* (2020.01)
 *H05B 47/16* (2020.01)
 *H05B 45/37* (2020.01)

(52) U.S. Cl.
 CPC ............. *H05B 45/14* (2020.01); *H05B 45/31* (2020.01); *H05B 47/16* (2020.01); *H05B 45/37* (2020.01)

(58) Field of Classification Search
 CPC ........ H05B 45/14; H05B 45/31; H05B 47/16; H05B 45/37
 See application file for complete search history.

(56) References Cited

U.S. PATENT DOCUMENTS

| | | | |
|---|---|---|---|
| 2016/0092174 A1* | 3/2016 | Miadowicz | G06F 8/31 717/118 |
| 2021/0045213 A1* | 2/2021 | Zhu | H05B 45/14 |
| 2021/0204375 A1* | 7/2021 | Li | H05B 45/3575 |
| 2021/0315077 A1* | 10/2021 | Sun | H05B 45/357 |

FOREIGN PATENT DOCUMENTS

| | | |
|---|---|---|
| CN | 102404899 B | 7/2015 |
| CN | 110300476 A | 10/2019 |

* cited by examiner

*Primary Examiner* — Minh D A
(74) *Attorney, Agent, or Firm* — CKC & Partners Co., LLC (57) ABSTRACT

The invention discloses a method for controlling a bleeder connected to a phase-cut dimmer and a circuit connected to a phase-cut dimmer. The method includes detecting an input voltage of the bleeder to obtain a detection voltage, and comparing the detection voltage and a preset reference voltage, wherein during a first time period, the detection voltage is less than the preset reference voltage, a start point of the first time period is a first moment, and an end point of the first time period is a second moment; delaying a first preset duration on the basis of the second moment to turn off the bleeder; and advancing a second preset duration on the basis of the first moment to turn on the bleeder.

23 Claims, 9 Drawing Sheets

Fig. 1

100 detecting an input voltage of the bleeder to obtain a detection voltage, and comparing the detection voltage and a preset reference voltage, wherein in a first time period, the detection voltage is less than the preset reference voltage, a start point of the first time period is a first moment, and an end point of the first time period is a second moment; — S101 delaying a first preset time to turn off the bleeder on the basis of the second moment; — S102 advancing a second preset time to turn on the bleeder on the basis of the first moment. — S103

METHOD FOR CONTROLLING BLEEDER CONNECTED TO PHASE-CUT DIMMER AND CIRCUIT CONNECTED TO PHASE-CUT DIMMER

CROSS-REFERENCE TO RELATED APPLICATIONS

This non-provisional application claims priority under 35 U.S.C. § 119(a) on Patent Application No. 202111640638.8 filed in P.R. China on Dec. 29, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the field of electronic techniques, and particularly to a method for controlling a bleeder connected to a phase-cut dimmer and a circuit connected to a phase-cut dimmer.

2. Related Art

Currently, most phase-cut dimmers in the market are controlled by triac. According to characteristic of the triac, if a current flowing through the triac is less than a holding current, the triac is turned off, causing the lamp to go out. Therefore, in order to apply an LED power supply to a triac dimmer, when the LED power supply operates, the current flowing through the triac shall be greater than a holding current of the triac, making the triac dimmer operate normally and realize dimming.

Figure 1:
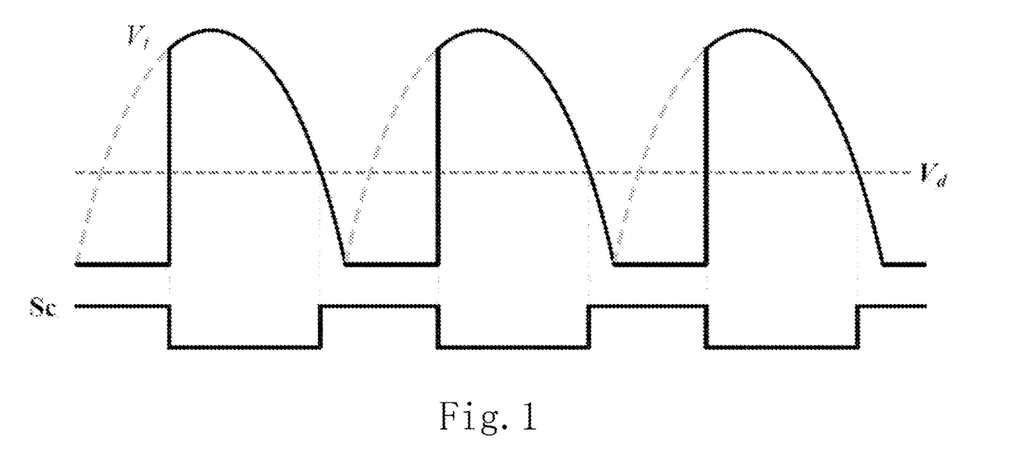
FIG. 1 is a waveform diagram of an existing control method.

In order to supply sufficient holding current, and ensure normal operation of the dimmer, the bleeder is controlled through timely detection of a Micro Control Unit (MCU) in most current applications. As shown in FIG. 1, a detection voltage $V_t$ is obtained by detecting an input voltage of the bleeder. When the detection voltage $V_t$ is less than a set threshold $V_d$, the MCU turns on the bleeder through a control signal Sc. When the detection voltage $V_t$ is higher than the set threshold $V_d$, the MCU turns off the bleeder through the control signal Sc. However, by such control method, MCU needs to sample the detection voltage $V_t$ timely, and a high sampling rate is needed to accurately control the bleeder, so more operation time of the MCU is needed. In addition, in the case of encountering interference when such control method is used, loss of the circuit may be higher, and thermal dissipation is serious, thereby affecting efficiency of the circuit. Moreover, with respect to a trailing edge phase-cut dimmer, the bleeder cannot be turned on in advance by such control method, causing inaccurate detection of phase-cut angles, affecting dimming, and causing flickering.

SUMMARY OF THE INVENTION

An object of the invention is to provide a method for controlling a bleeder connected to a phase-cut dimmer and a circuit connected to a phase-cut dimmer, which can solve one or more defects in the prior art.

In order to achieve the above object, according to one embodiment of the invention, the invention provides a method for controlling a bleeder connected to a phase-cut dimmer, including: detecting an input voltage of the bleeder to obtain a detection voltage, and comparing the detection voltage and a preset reference voltage, wherein during a first time period, the detection voltage is less than the preset reference voltage, a start point of the first time period is a first moment, and an end point of the first time period is a second moment; delaying a first preset duration on the basis of the second moment to turn off the bleeder; and advancing a second preset duration on the basis of the first moment to turn on the bleeder.

In one embodiment of the invention, a low level control signal is provided to the bleeder for turning off the bleeder, and a high level control signal is provided to the bleeder for turning on the bleeder.

In one embodiment of the invention, when the bleeder is turned off is controlled by a first timer; and when the bleeder is turned on is controlled by a second timer.

In one embodiment of the invention, the method includes: timely detecting a waveform of a comparison result of the detection voltage and the preset reference voltage; when a falling edge of the waveform is detected, starting the first timer, and when a timing duration of the first timer ends, turning off the bleeder, wherein the timing duration of the first timer is equal to the first preset duration; and when a rising edge of the waveform is detected, starting the second timer, and when a timing duration of the second timer ends, turning on the bleeder, wherein the timing duration of the second timer is equal to a current reference period of the input voltage subtracting the second preset duration.

In one embodiment of the invention, after a rising edge of the waveform is detected, and before the second timer is started further include: determining the current reference period of the input voltage.

In one embodiment of the invention, determining the current reference period of the input voltage includes: determining a first period of the input voltage according to two adjacent rising edges of the waveform; determining a second period of the input voltage according to two adjacent falling edges of the waveform; and selecting the minimum value of the first period and the second period as the current reference period of the input voltage.

In one embodiment of the invention, determining the first period includes: calculating the current first period according to a current capturing value of the two adjacent rising edges of the waveform through a micro control unit; and comparing the current first period and a power grid period, and when the current first period is in a normal range of the power grid period, taking the current first period as the first period; when the current first period is not in a normal range of the power grid period, taking the previous first period as the first period; determining the second period includes: calculating the current second period according to a current capturing value of the two adjacent falling edges of the waveform through the micro control unit; and comparing the current second period and the power grid period, and when the current second period is in a normal range of the power grid period, taking the current second period as the second period; when the current second period is not in a normal range of the power grid period, taking the previous second period as the second period.

In one embodiment of the invention, the phase-cut dimmer is a leading edge phase-cut dimmer or a trailing edge phase-cut dimmer.

In one embodiment of the invention, when the phase-cut dimmer is the leading edge phase-cut dimmer, the bleeder is controlled by detecting a current flowing through the bleeder.

In one embodiment of the invention, controlling the bleeder by detecting a current flowing through the bleeder includes: during a period when the input voltage is cut, the bleeder is in a turn-on state, and the input voltage is zero, causing the current flowing through the bleeder to be zero; and when the input voltage is greater than zero, and the current flowing through the bleeder detected to begin to be greater than zero, starting a first timer, and turning off the bleeder after the first preset duration.

In order to achieve the above object, the invention further provides a circuit connected to a phase-cut dimmer, including: a bleeder electrically connected to the phase-cut dimmer; an input voltage detector for detecting an input voltage of the bleeder to obtain a detection voltage; a comparator for comparing the detection voltage and a preset reference voltage to generate a comparison signal, wherein during a first time period, the detection voltage is less than the preset reference voltage, a start point of the first time period is a first moment, and an end point of the first time period is a second moment; and a controller for delaying a first preset duration on the basis of the second moment to turn off the bleeder, and advancing a second preset duration on the basis of the first moment to turn on the bleeder according to the detection voltage and the comparison signal.

In another embodiment of the invention, the controller correspondingly provides a low level control signal to the bleeder to turn off the bleeder, and correspondingly provides a high level control signal to the bleeder to turn on the bleeder.

In another embodiment of the invention, the controller further includes: a first timer controlling the time when the bleeder is turned off; and a second timer controlling the time when the bleeder is turned on.

In another embodiment of the invention, the controller is configured to execute: timely detecting a waveform of a comparison result of the detection voltage and the preset reference voltage; when a falling edge of the waveform is detected, starting the first timer, and when a timing duration of the first timer ends, turning off the bleeder, wherein the timing duration of the first timer is equal to the first preset duration; and when a rising edge of the waveform is detected, starting the second timer, and when a timing duration of the second timer ends, turning on the bleeder, wherein the timing duration of the second timer is equal to a current reference period of the input voltage subtracting the second preset duration.

In another embodiment of the invention, the controller is further configured to determine the current reference period of the input voltage after the rising edge of the waveform is detected, and before the second timer is started.

In another embodiment of the invention, determining, by the controller, the current reference period of the input voltage includes: determining a first period of the input voltage according to two adjacent rising edges of the waveform; determining a second period of the input voltage according to two adjacent falling edges of the waveform; and selecting the minimum value of the first period and the second period as the current reference period of the input voltage.

In another embodiment of the invention, the controller is a micro control unit, wherein, determining the first period by the controller includes: calculating the current first period according to a current capturing value of the two adjacent rising edges of the waveform through the micro control unit; and comparing the current first period and a power grid period, and when the current first period is in a normal range of the power grid period, taking the current first period as the first period; when the current first period is not in a normal range of the power grid period, taking the previous first period as the first period; determining the second period by the controller includes: calculating the current second period according to a current capturing value of the two adjacent falling edges of the waveform through the micro control unit; and comparing the current second period and the power grid period, and when the current second period is in a normal range of the power grid period, taking the current second period as the second period; when the current second period is not in a normal range of the power grid period, taking the previous second period as the second period.

In another embodiment of the invention, the phase-cut dimmer is a leading edge phase-cut dimmer or a trailing edge phase-cut dimmer.

In another embodiment of the invention, when the phase-cut dimmer is the leading edge phase-cut dimmer, the controller controls the bleeder by detecting a current flowing through the bleeder.

In another embodiment of the invention, controlling the bleeder by the controller by detecting a current flowing through the bleeder includes: during a period when the input voltage is cut, the bleeder is controlled to be in a turn-on state, and the input voltage is zero, causing the current flowing through the bleeder to be zero; and when the input voltage is greater than zero and the current flowing through the bleeder detected to begin to be greater than zero, controlling to start a first timer, and turning off the bleeder after the first preset duration.

In another embodiment of the invention, the comparator and the controller are integrated into a micro control unit.

In another embodiment of the invention, the circuit further includes: a rectifier for rectifying a voltage after phase cutting by the phase-cut dimmer, and outputting the rectified voltage to the bleeder and the input voltage detector.

In another embodiment of the invention, the circuit further includes: a power converter for receiving a voltage outputted from the phase-cut dimmer and supplying power to a load; wherein the controller is further configured to determine a dimming signal according to the comparison signal, and the power converter receives the dimming signal and adjusts brightness of the load.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in details with reference to the accompanying drawings, through which the above and other features and advantages of the invention will become more apparent.

DETAILED EMBODIMENTS OF THE INVENTION

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. In addition, the terms "first", "second" and the like in the claims are only used as signs, instead of numeral limitations to objects.

Figure 2:
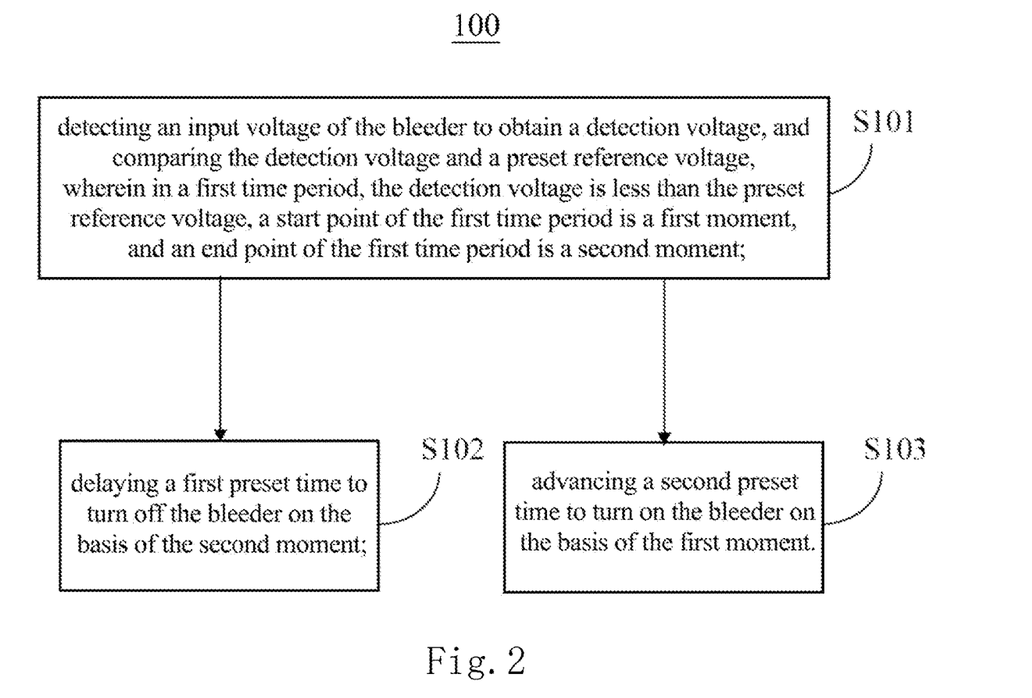
FIG. 2 is a flow diagram of a method for controlling a bleeder connected to a phase-cut dimmer according to the invention.

As shown in FIG. 2, the invention provides a method 100 for controlling a bleeder connected to a phase-cut dimmer, mainly including the steps of:

Step S101, detecting an input voltage of the bleeder to obtain a detection voltage, and comparing the detection voltage with a preset reference voltage, wherein during a first time period, the detection voltage is less than the preset reference voltage, a start point of the first time period is a first moment, and an end point of the first time period is a second moment;

Step S102, delaying a first preset duration on the basis of the second moment to turn off the bleeder; and Step S103, advancing a second preset duration on the basis of the first moment to turn on the bleeder.

Figure 3:
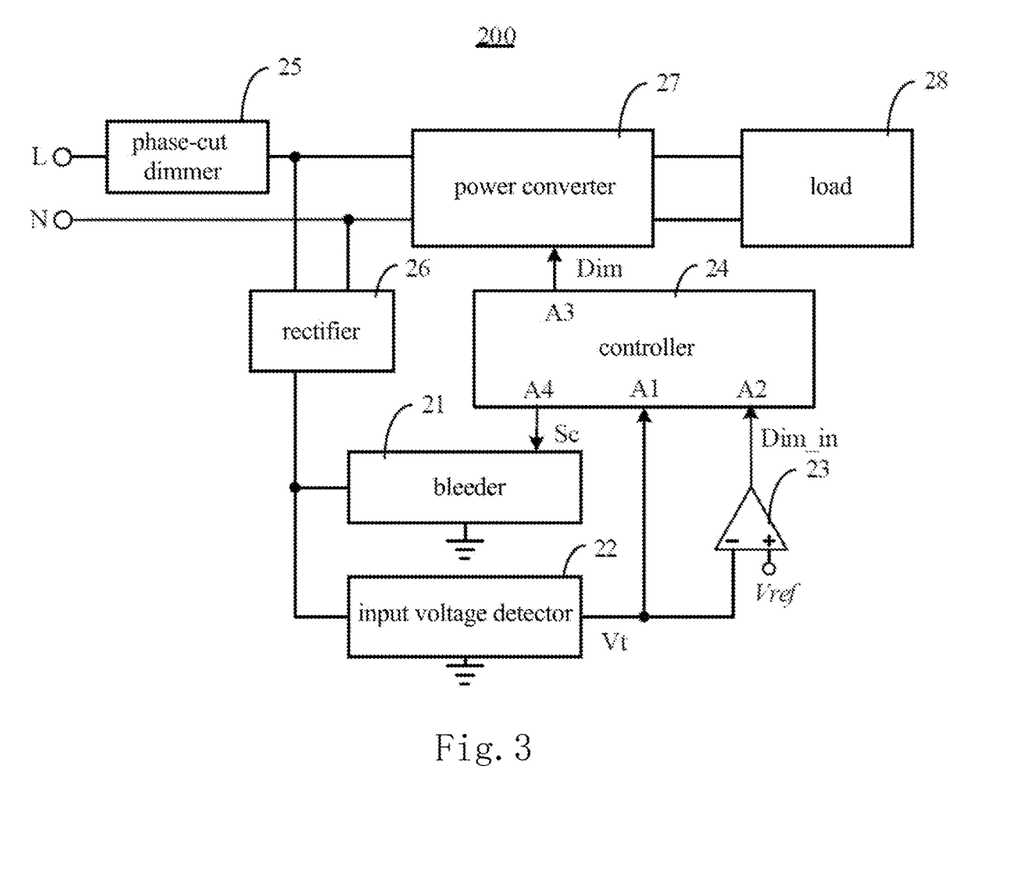
FIG. 3 is a schematic diagram of composition architecture of a circuit connected to a phase-cut dimmer according to the invention.

As shown in FIG. 3, it illustrates a circuit 200 connected to a phase-cut dimmer 25 according to the invention, for example, connected between an L line and a N line through the phase-cut dimmer 25. The circuit 200, for example, may include a bleeder 21 electrically connected to the phase-cut dimmer 25, an input voltage detector 22 for detecting an input voltage of the bleeder 21 to obtain a detection voltage $V_t$, a comparator 23 for comparing the detection voltage $V_t$ with a preset reference voltage $V_{ref}$ to generate a comparison signal Dim_in, and a controller 24. During a first time period, the detection voltage $V_t$ is less than the preset reference voltage $V_{ref}$, a start point of the first time period is a first moment, and an end point of the first time period is a second moment. The controller 24 may be configured to delay the first preset duration to turn off the bleeder on the basis of the second moment, and advance the second preset duration to turn on the bleeder on the basis of the first moment according to the detection voltage $V_t$ and the comparison signal Dim_in.

In this embodiment, preferably, the bleeder 21, for example, may be a constant current leakage circuit, the controller 24, for example, may be a micro control unit (MCU), and the load 28, for example, may be an LED, but the invention is not limited thereto.

In some embodiments of the invention, the circuit 200 may further include a rectifier 26 for rectifying a voltage after phase cutting by the phase-cut dimmer 25, and outputting the rectified voltage to the bleeder 21 and the input voltage detector 22.

In some embodiments of the invention, the circuit 200 may further include a power converter 27 for receiving the voltage outputted from the phase-cut dimmer 25, and supplying power to the load 28. The power converter 27, for example, may be an AC/DC converter. The controller 24 may further determine a dimming signal Dim according to the comparison signal Dim_in, and the power converter 27 receives the dimming signal Dim and adjusts brightness of the load 28 (e.g., the LED).

Figure 4:
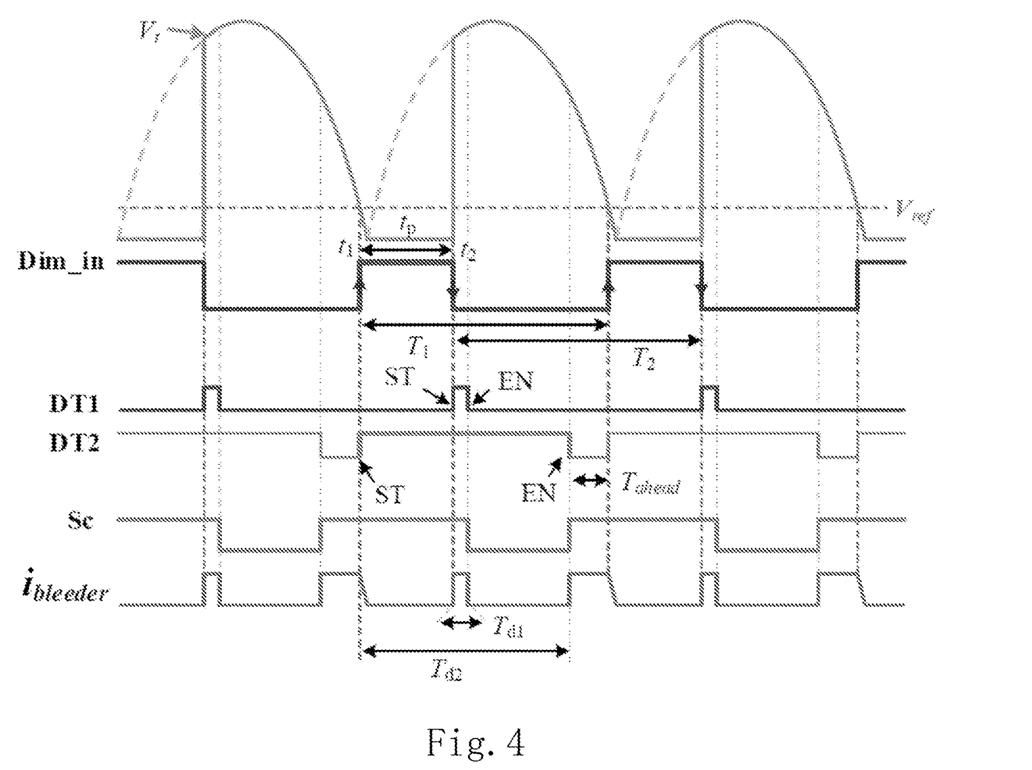
FIG. 4 is a waveform diagram of leading edge phase-cut control performed by a bleeder connected to a phase-cut dimmer according to the invention.

In one embodiment, taking the controller 24 as the MCU, the load 28 as the LED, and the power converter 27 as the AC/DC converter for example, the circuit and the control method thereof in the invention are further explained in detail. In this embodiment, an AC voltage between the L line and the N line is outputted to the power converter 27 after phase cutting of the phase-cut dimmer 25. The power converter 27 converts the voltage after phase cutting, and supplies an output voltage to the load 28. The rectifier 26 rectifies the voltage after phase cutting to a full-wave voltage. The full-wave voltage is converted to the detection voltage $V_t$ by the input voltage detector 22, and the detection voltage $V_t$ is transmitted to a sampling port (e.g., a port A1) of the MCU and the comparator 23. A reference terminal of the comparator 23 is fed with a fixed preset reference voltage $V_{ref}$, and by comparing the detection voltage $V_t$ and the preset reference voltage $V_{ref}$, the comparison signal Dim_in is generated and transmitted to the MCU (e.g., the port A2) for calculating a dimming current. Waveform of the comparison signal Dim_in is shown in FIG. 4. Of course, the comparator 23 can also be implemented by a comparator inside an MCU. That is, the comparator 23 and the controller 24 may be integrated into the MCU for cost saving. The MCU calculates phase-cut angles by sampling widths of high and low levels of the comparison signal Dim_in, and outputting a dimming signal Dim corresponding to a dimming brightness from a port A3, and the dimming signal Dim finally controls a current correspondingly outputted from the power converter 27 to control brightness of the LED (i.e., the load 28). The rectified voltage may also be transmitted to the bleeder 21, and when the bleeder 21 is turned on and off may be determined by a control signal Sc (outputted from a port A4 of the MCU) of the MCU. For example, the MCU may correspondingly generate a low level control signal to the bleeder to turn off the bleeder, and may correspondingly generate a high level control signal to the bleeder to turn on the bleeder, but the invention is not limited thereto.

Figure 5:
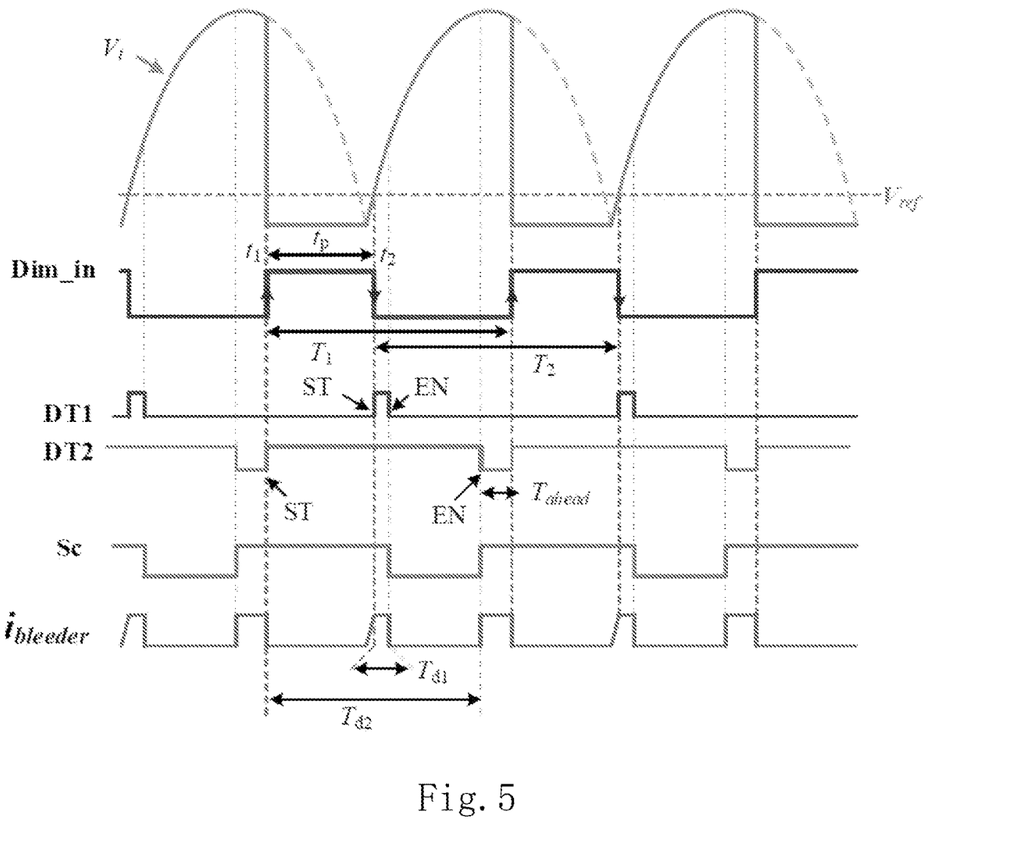
FIG. 5 is a waveform diagram of trailing edge phase-cut control performed by a bleeder connected to a phase-cut dimmer according to the invention.

Specific control waveforms of the invention are shown in FIGS. 4 and 5, including operation waveforms when the leading edge phase-cut dimmer and the trailing edge phase-cut dimmer are connected. FIG. 4 illustrates control waveforms of leading edge phase-cut control applied to the leading edge phase-cut dimmer, and FIG. 5 illustrates control waveforms of trailing edge phase-cut control applied to the trailing edge phase-cut dimmer. In FIGS. 4 and 5, waveforms of the detection voltage $V_t$, the comparison signal Dim_in, an output DT1 of a first timer, an output DT2 of a second timer, the control signal Sc and a current $i_{bleeder}$ flowing through the bleeder are sequentially shown from top to bottom. The comparison signal Dim_in is the waveform of a result comparing the detection voltage $V_t$ and the preset reference voltage $V_{ref}$. When the detection voltage $V_t$ is greater than the preset reference voltage $V_{ref}$, the comparison signal Dim_in is at a low level. On the contrary, when the detection voltage $V_t$ is less than the preset reference voltage $V_{ref}$, the comparison signal Dim_in is at a high level.

Referring to FIG. 3, as shown in FIG. 4, taking leading edge phase-cut control of the leading edge phase-cut dimmer for example, control logic for the bleeder is as follows. The MCU timely detects the comparison signal Dim_in, wherein during a first time period $t_p$ of the comparison signal Dim_in, the detection voltage $V_t$ is less than the preset reference voltage $V_{ref}$, a start point of the first time period $t_p$ is a first moment $t_1$, and an end point of the first time period $t_p$ is a second moment $t_2$.

When a falling edge of the comparison signal Dim_in is detected, the MCU starts the first timer, and the first timer outputs a high level within a timing duration $T_{d1}$. The first timer begins timing on the basis of the second moment $t_2$, for example, starts from a time point ST of the waveform of the output DT1 of the first timer, and ends at a time point EN. When the timing duration $T_{d1}$ of the first timer ends, the MCU may turn off the bleeder 21 through the control signal Sc, and the current flowing through the bleeder 21 becomes zero. For example, when the timing duration $T_{d1}$ ends, the control signal Sc changes from a high level to a low level, such that the bleeder 21 does not operate (i.e., the bleeder is turned off).

When a rising edge of the comparison signal Dim_in is detected, the MCU starts the second timer, and the second timer outputs a high level within a timing duration $T_{d2}$. The second timer begins timing on the basis of the first moment $t_1$, for example, starts from a time point ST of the waveform of the output DT2 of the second timer, and ends at a time point EN. When the timing duration $T_{d2}$ of the second timer ends, the MCU may turn on the bleeder 21 through the control signal Sc. For example, when the timing duration $T_{d2}$ ends, the control signal Sc changes from a low level to a high level, such that the bleeder 21 operates (i.e., the bleeder is turned on).

In some embodiments of the invention, in particular, the timing duration $T_{d1}$ of the first timer is equal to a first preset duration which is a fixed value. The timing duration $T_{d1}$ shall not be too long, because as for the leading edge phase-cut dimmer, the input voltage at this time is high, and if the timing duration $T_{d1}$ is too long, loss of the bleeder is increased, thereby affecting efficiency of the circuit. Therefore, it only needs to be as long as to ensure that the dimmer is not turned off when the dimmer produces ringing. The timing duration $T_{d2}$ of the second timer is not fixed, and the second timer shall ensure that the bleeder is turned on before the next rising edge of the comparison signal Dim_in, such that the MCU can correctly detect the comparison signal Dim_in. Therefore, the second timer calculates the timing duration $T_{d2}$ according to a current reference period T of the input voltage of the bleeder subtracting a second preset duration $T_{ahead}$, i.e., $T_{d2}=T-T_{ahead}$.

In some embodiments of the invention, after the rising edge of the comparison signal Dim_in is detected and before the second timer is started, the step of determining the current reference period of the input voltage is further included. In particular, the MCU detects the current reference period T of the input voltage according to the comparison signal Dim_in. In order to avoid distortion of the input voltage or interference caused by dimming, the MCU detects a first period T1 of two adjacent rising edges and a second period T2 of two adjacent falling edges of the comparison signal Dim_in simultaneously, and selects the minimum value of the first period T1 and the second period T2 as the current reference period T of the input voltage, which is a reference value for calculating the timing duration $T_{d2}$ of the second timer, thereby improving reliability, and avoiding turn-off of the dimmer caused by turning on the bleeder too late.

Figure 6:
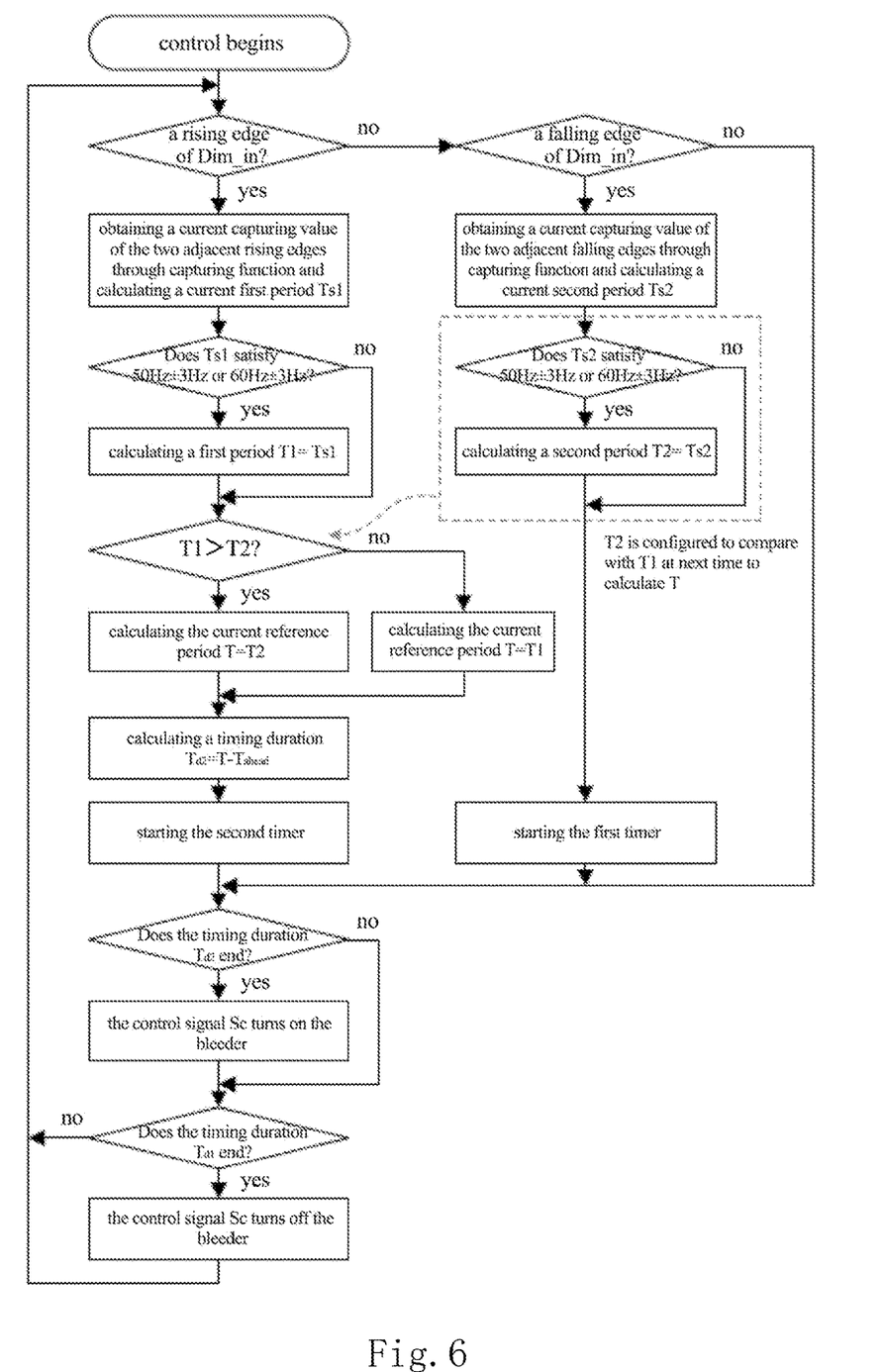
FIG. 6 is a flow diagram of performing software control through a MCU in a control method according to the invention.

In one preferable embodiment, the first period T1 and the second period T2 may be implemented by capturing function of the MCU, and specific control may be shown as the flow diagram shown in FIG. 6. The MCU determines the first period T1 according to the current capturing value of the two adjacent rising edges of the comparison signal Dim_in, and determines the second period T2 according to the current capturing value of the two adjacent falling edges of the comparison signal Dim_in.

More specifically, as shown in FIG. 6, when the rising edge of the comparison signal Dim_in is detected, the MCU may obtain a current capturing value of the two adjacent rising edges through capturing function and calculate a current first period Ts1. If the current first period Ts1 is in a normal range of a power grid period (e.g., the Ts1 satisfies 50 Hz±3 Hz or 60 Hz±3 Hz, but the invention is not limited thereto), the MCU selects the current first period Ts1 as the first period T1. If the current first period Ts1 is not in the normal range of the power grid period (e.g., the Ts1 does not satisfy 50 Hz±3 Hz or 60 Hz±3 Hz, but the invention is not limited thereto), the MCU selects the previous first period as the first period T1.

When the falling edge of the waveform of the comparison signal Dim_in is detected, the MCU may obtain a current capturing value of the two adjacent falling edges through capturing function and calculate a current second period Ts2. If the current second period Ts2 is in a normal range of the power grid period (e.g., the Ts2 satisfies 50 Hz±3 Hz or 60 Hz±3 Hz, but the invention is not limited thereto), the MCU selects the current second period Ts2 as the second period T2. If the current second period Ts2 is not in the normal range of the power grid period (e.g., the Ts2 does not satisfy 50 Hz±3 Hz or 60 Hz±3 Hz, but the invention is not limited thereto), the MCU selects the previous second period as the second period T2.

After the first period T1 and the second period T2 are determined, the MCU compares the first period T1 and the second period T2, and selects the minimum value of the first period T1 and the second period T2 as the current reference period T of the input voltage, which is a reference value for calculating the timing duration $T_{d2}$ of the second timer. For example, when T1>T2, the current reference period T is set to be equal to the second period T2. On the contrary, the current reference period T is set to be equal to the first period T1. Accordingly, the MCU may further calculate the timing duration $T_{d2}$ of the second timer according to the formula $T_{d2}=T-T_{ahead}$. The MCU may start the second timer when the rising edge of the waveform of the comparison signal Dim_in is detected, and start the first timer when the falling edge of the waveform of the comparison signal Dim_in is detected. When the timing duration $T_{d2}$ of the second timer ends, the MCU turns on the bleeder through the control signal Sc. When the timing duration $T_{d1}$ of the first timer ends, the MCU turns off the bleeder through the control signal Sc.

Waveforms of trailing edge phase-cut control performed by the trailing edge phase-cut dimmer are shown in FIG. 5. As can be seen from the waveforms in FIG. 5, the same control logic is also suitable for the trailing edge phase-cut dimmer. Specific control flow of the MCU may be shown in FIG. 6.

Figure 7:
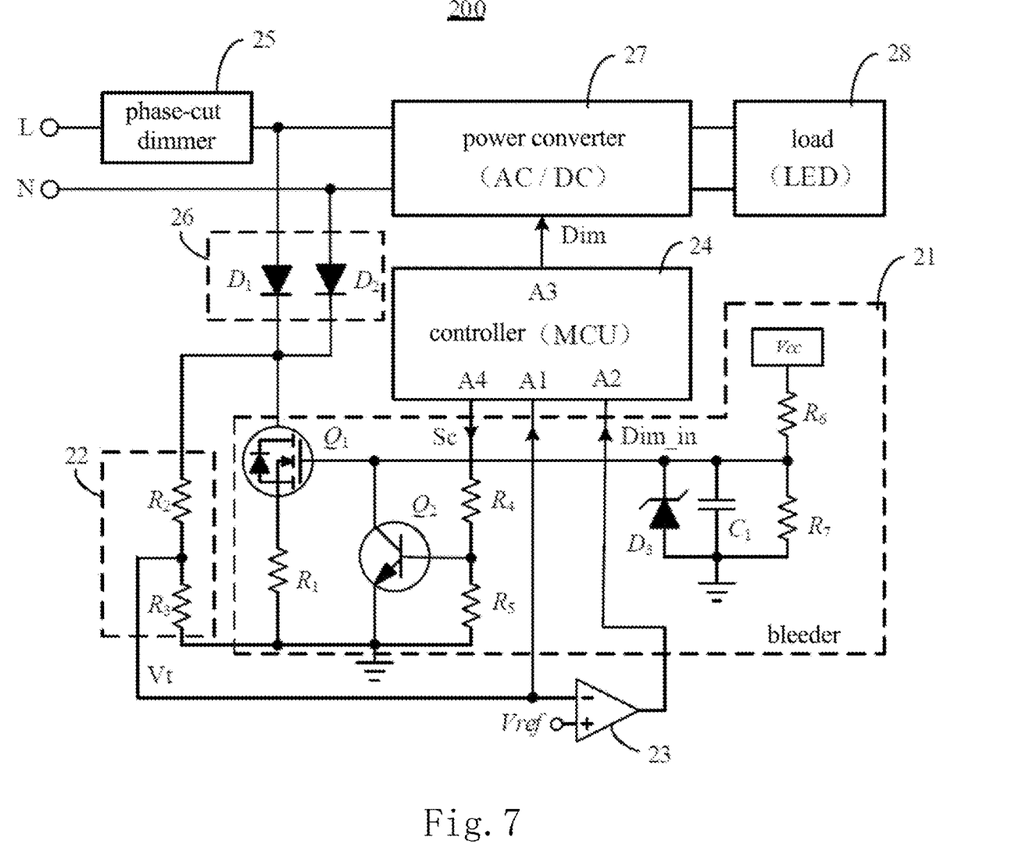
FIG. 7 is a structural diagram of a circuit in which a control method is applied to an embodiment according to the invention.
Figure 8:
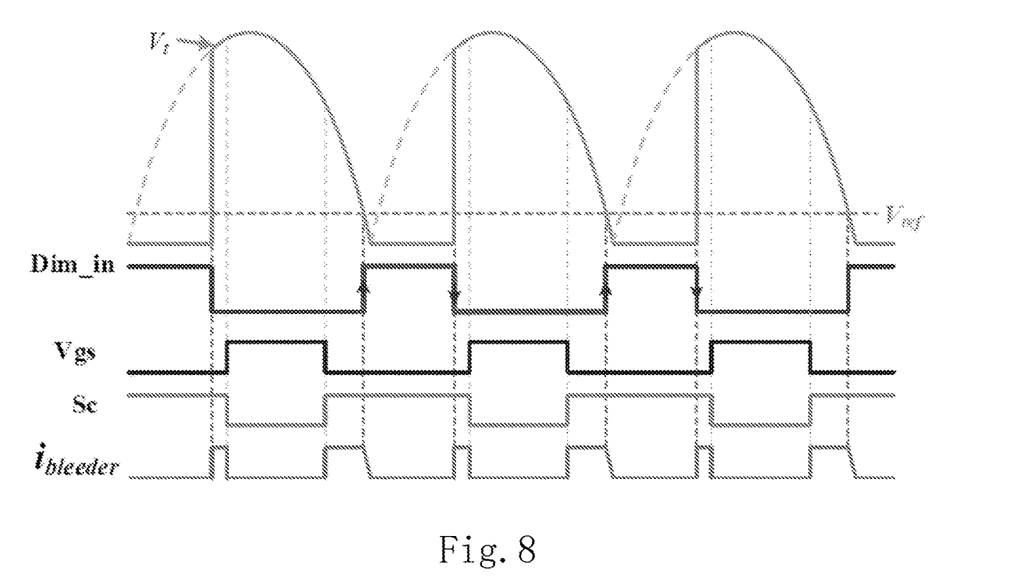
FIG. 8 is a waveform diagram of leading edge phase-cut control performed by a leading edge phase-cut dimmer in actual application.
Figure 9:
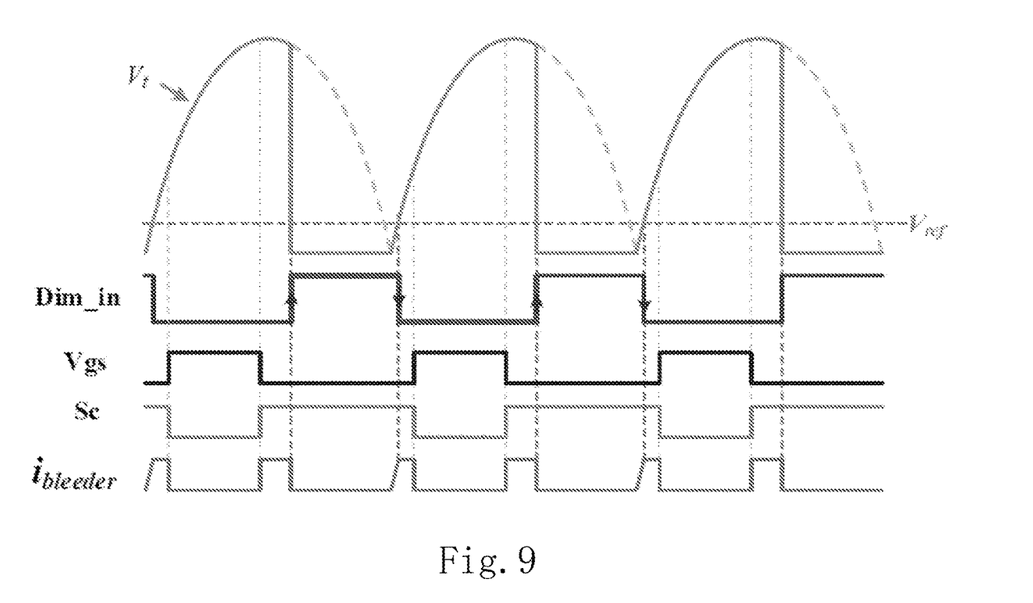
FIG. 9 is a waveform diagram of trailing edge phase-cut control performed by a trailing edge phase-cut dimmer in actual application.

With respect to the control method of the invention, a circuit structure in one embodiment is shown in FIG. 7. In FIG. 7, the rectifier 26 includes a diode $D_1$ and a diode $D_2$ for rectifying the input voltage of the power converter 27. The input voltage detector 22 includes a resistor $R_2$ and a resistor $R_3$ connected in series for detecting the input voltage of the bleeder to obtain the detection voltage $V_t$. The bleeder 21 includes a switch $Q_1$, a resistor $R_1$, a resistor $R_6$, a resistor $R_7$, a capacitor $C_1$, a diode $D_3$, a transistor $Q_2$, a resistor $R_4$ and a resistor $R_5$. The MCU controls the time when the bleeder is turned on and off, and generates the dimming signal Dim for dimming by detecting the detection voltage $V_t$ and the comparison signal Dim_in. The resistor $R_2$ and the resistor $R_3$ of the input voltage detector 22 divide the input voltage to obtain the detection voltage $V_t$ and transmit it to the MCU. The detection voltage $V_t$ and the preset reference voltage $V_{ref}$ are compared by the comparator 23 to generate the comparison signal Dim_in, which is used for the MCU to calculate the phase-cut angles and control the bleeder 21. A stable voltage source Vcc provides a stable voltage to a G electrode of the switch $Q_1$ through the resistor $R_6$, the resistor $R_7$, the capacitor $C_1$ and the diode $D_3$. When the control signal Sc outputted from the MCU is at a low level, the transistor $Q_2$ is cut off, the switch $Q_1$ is turned on under control of a driving voltage, and the current flows through the resistor $R_1$. With an increase of the current through the $R_1$, due to negative feedback, a voltage Vgs at both ends of the G electrode and a S electrode of the switch $Q_1$ is reduced, and finally stabilized to a fixed value, so the current flowing through the resistor $R_1$ is finally stabilized to a constant value too. The current is supplied as a holding current for the phase-cut dimmer 25 of the circuit. When the control signal Sc outputted from the MCU is at a high level, the transistor $Q_2$ is turned on, a driving terminal of the switch $Q_1$ is grounded, and the switch $Q_1$ is cut off and no current flows through the resistor $R_1$. In actual application, specific control waveforms of the leading edge phase-cut dimmer and the trailing edge phase-cut dimmer are shown in FIGS. 8 and 9, respectively.

Advantages of the control method in the invention are as follows. (1) Since a period of the input voltage is timely sampled, fluctuation of the voltage and frequency of the power grid can be adapted, thereby avoiding flickering caused by abnormal control. (2) The same control logic may be suitable for both the leading edge phase-cut dimmer and the trailing edge phase-cut dimmer and there is no need to detect whether the connected dimmer is the leading edge phase-cut dimmer or the trailing edge phase-cut dimmer, so compatibility is good, and control is simple. (3) When the bleeder is turned on and off may be accurately controlled using digital control, so control is accurate, loss of the circuit may be reduced, and efficiency is improved. (4) Abnormal control timing of the bleeder caused by asymmetry of positive and negative half waves of the grid voltage can be avoided by selecting the suitable current reference period T, thereby improving detection accuracy of the phase-cut angles, and avoiding flickering.

Figure 10:
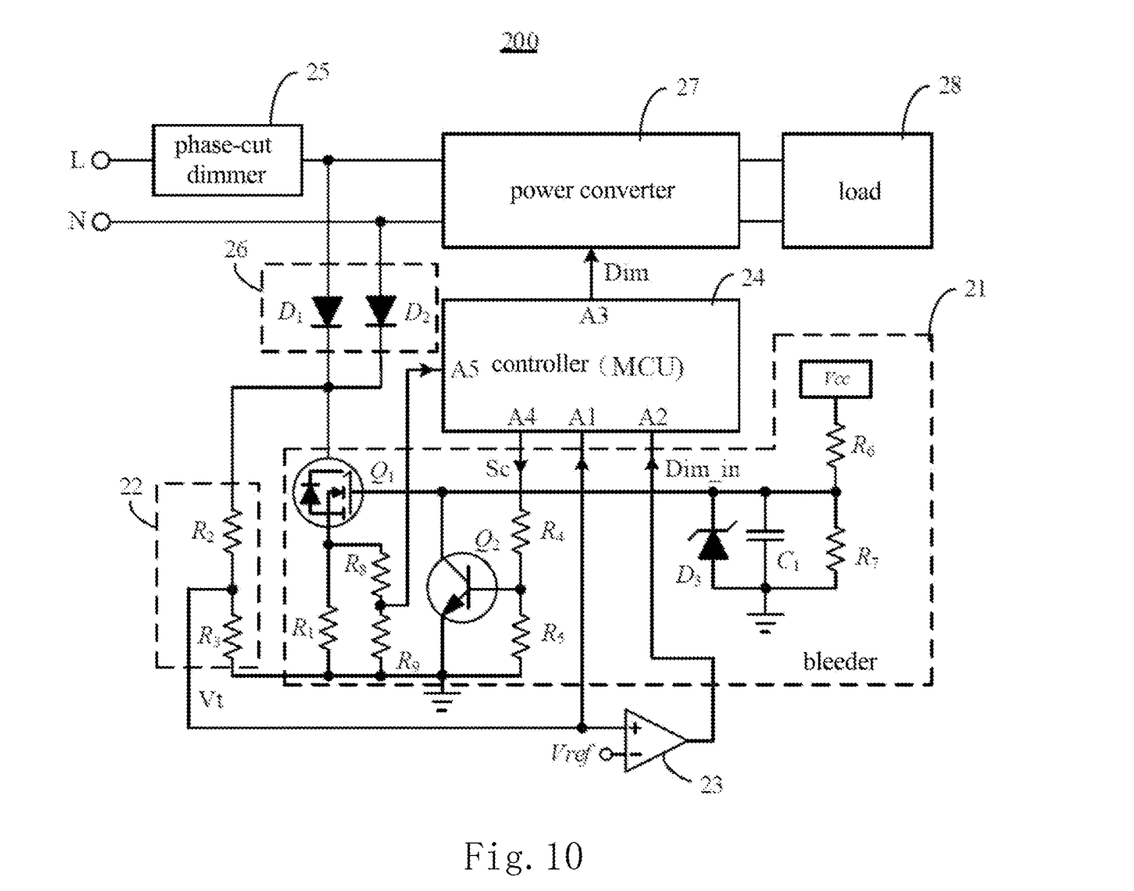
FIG. 10 is a schematic diagram of composition architecture of a circuit in another embodiment when the phase-cut dimmer is a leading edge phase-cut dimmer.
Figure 11:
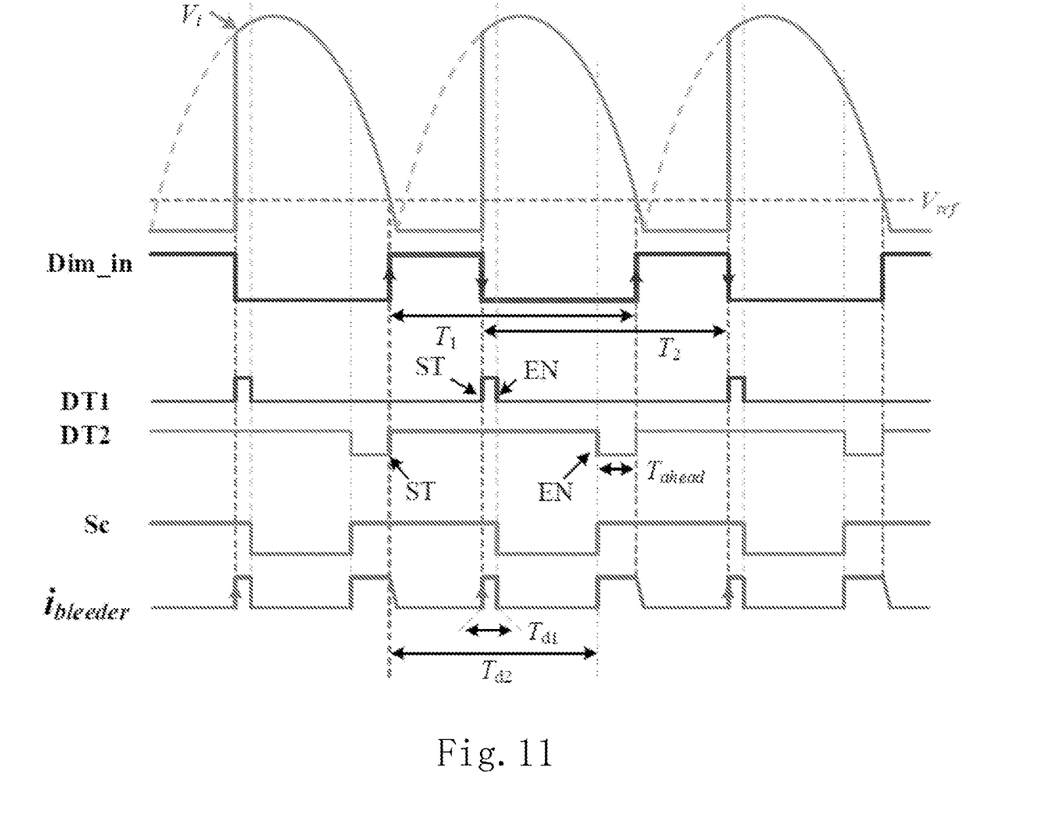
FIG. 11 is a waveform diagram of leading edge phase-cut control in one embodiment of FIG. 10.

In some embodiments of the invention, if the connected phase-cut dimmer is the leading edge phase-cut dimmer, as shown in FIG. 10, when the bleeder is turned off can be controlled by detecting the current $i_{bleeder}$ flowing through the bleeder. For example, the current $i_{bleeder}$ may be detected through a detection branch consisting of a resistor $R_8$ and a resistor $R_9$. The detected value reflecting current $i_{bleeder}$ is transmitted to a port A5 of the MCU, and specific control waveforms are shown in FIG. 11. As for the leading edge phase-cut dimmer, during a period when the input voltage is cut, the bleeder is always in an enabled state, i.e., the control signal the bleeder received is at a high level, but since the input voltage is zero, the current $i_{bleeder}$ flowing through the bleeder detected is also zero. When the input voltage is greater than zero, the current $i_{bleeder}$ flowing through the bleeder detected begins to be greater than zero, so the first timer can be started, and the bleeder is turned off once the timing duration $T_{d1}$ (e.g., which is equal to the first preset duration) ends. When the bleeder is turned off is the same as in the previous method.

With the control method in the embodiments shown in FIGS. 10-11, the MCU can calculate actual loss of the bleeder more conveniently and accurately by directly sampling the leakage current $i_{bleeder}$ of the bleeder. Furthermore, suitable protection can be set to prevent overheating damage of the bleeder, and power loss can be reduced.

Exemplary embodiments of the invention are illustrated and described in details. It shall be understood that the invention is not limited to the disclosed embodiments, and in contrast, the invention aims to cover various modifications and equivalent arrangements included in spirit and scope of the appended claims.

What is claimed is:

1. A method for controlling a bleeder connected to a phase-cut dimmer, comprising:
   detecting an input voltage of the bleeder to obtain a detection voltage, and comparing the detection voltage and a preset reference voltage, wherein during a first time period, the detection voltage is less than the preset reference voltage, a start point of the first time period is a first moment, and an end point of the first time period is a second moment;
   delaying a first preset duration on the basis of the second moment to turn off the bleeder; and
   advancing a second preset duration on the basis of the first moment to turn on the bleeder, comprising:
   timely detecting a waveform of a comparison result of the detection voltage and the preset reference voltage,
   when a rising edge of the waveform is detected, starting a second timer, and when a timing duration of the second timer ends, turning on the bleeder, wherein the timing duration of the second timer is equal to a current reference period of the input voltage subtracting the second preset duration.

2. The method for controlling a bleeder connected to a phase-cut dimmer according to claim 1, wherein a low level control signal is provided to the bleeder for turning off the bleeder, and a high level control signal is provided to the bleeder for turning on the bleeder.

3. The method for controlling a bleeder connected to a phase-cut dimmer according to claim 1, wherein,
when the bleeder is turned off is controlled by a first timer.

4. The method for controlling a bleeder connected to a phase-cut dimmer according to claim 3, comprising:
when a falling edge of the waveform is detected, starting the first timer, and when a timing duration of the first timer ends, turning off the bleeder, wherein the timing duration of the first timer is equal to the first preset duration.

5. The method for controlling a bleeder connected to a phase-cut dimmer according to claim 4, wherein after a rising edge of the waveform is detected, and before the second timer is started further comprise:
determining the current reference period of the input voltage.

6. The method for controlling a bleeder connected to a phase-cut dimmer according to claim 5, wherein determining the current reference period of the input voltage comprises:
determining a first period of the input voltage according to two adjacent rising edges of the waveform;
determining a second period of the input voltage according to two adjacent falling edges of the waveform; and
selecting the minimum value of the first period and the second period as the current reference period of the input voltage.

7. The method for controlling a bleeder connected to a phase-cut dimmer according to claim 6, wherein,
determining the first period comprises:
calculating the current first period according to a current capturing value of the two adjacent rising edges of the waveform through a micro control unit; and
comparing the current first period and a power grid period, and when the current first period is in a normal range of the power grid period, taking the current first period as the first period; when the current first period is not in a normal range of the power grid period, taking the previous first period as the first period;
determining the second period comprises:
calculating the current second period according to a current capturing value of the two adjacent falling edges of the waveform through the micro control unit; and
comparing the current second period and the power grid period, and when the current second period is in a normal range of the power grid period, taking the current second period as the second period; when the current second period is not in a normal range of the power grid period, taking the previous second period as the second period.

8. The method for controlling a bleeder connected to a phase-cut dimmer according to claim 1, wherein the phase-cut dimmer is a leading edge phase-cut dimmer or a trailing edge phase-cut dimmer.

9. The method for controlling a bleeder connected to a phase-cut dimmer according to claim 8, wherein when the phase-cut dimmer is the leading edge phase-cut dimmer, the bleeder is controlled by detecting a current flowing through the bleeder.

10. The method for controlling a bleeder connected to a phase-cut dimmer according to claim 9, wherein controlling the bleeder by detecting a current flowing through the bleeder comprises:

during a period when the input voltage is cut, the bleeder is in a turn-on state, and the input voltage is zero, causing the current flowing through the bleeder to be zero; and
when the input voltage is greater than zero and the current flowing through the bleeder detected to begin to be greater than zero, starting a first timer, and turning off the bleeder after the first preset duration.

11. A circuit connected to a phase-cut dimmer, comprising:
a bleeder electrically connected to the phase-cut dimmer;
an input voltage detector for detecting an input voltage of the bleeder to obtain a detection voltage;
a comparator for comparing the detection voltage and a preset reference voltage to generate a comparison signal, wherein during a first time period, the detection voltage is less than the preset reference voltage, a start point of the first time period is a first moment, and an end point of the first time period is a second moment; and
a controller for delaying a first preset duration on the basis of the second moment to turn off the bleeder, and advancing a second preset duration on the basis of the first moment to turn on the bleeder according to the detection voltage and the comparison signal,
wherein the controller is configured to execute:
timely detecting a waveform of a comparison result of the detection voltage and the preset reference voltage;
when a rising edge of the waveform is detected, starting a second timer, and when a timing duration of the second timer ends, turning on the bleeder, wherein the timing duration of the second timer is equal to a current reference period of the input voltage subtracting the second preset duration.

12. The circuit connected to a phase-cut dimmer according to claim 11, wherein the controller correspondingly provides a low level control signal to the bleeder to turn off the bleeder, and correspondingly provides a high level control signal to the bleeder to turn on the bleeder.

13. The circuit connected to a phase-cut dimmer according to claim 11, wherein the controller further comprises:
a first timer controlling the time when the bleeder is turned off.

14. The circuit connected to a phase-cut dimmer according to claim 13, wherein the controller is configured to execute:
when a falling edge of the waveform is detected, starting the first timer, and when a timing duration of the first timer ends, turning off the bleeder, wherein the timing duration of the first timer is equal to the first preset duration.

15. The circuit connected to a phase-cut dimmer according to claim 14, wherein the controller is further configured to determine the current reference period of the input voltage after the rising edge of the waveform is detected, and before the second timer is started.

16. The circuit connected to a phase-cut dimmer according to claim 15, wherein determining, by the controller, the current reference period of the input voltage comprises:
determining a first period of the input voltage according to two adjacent rising edges of the waveform;
determining a second period of the input voltage according to two adjacent falling edges of the waveform; and
selecting the minimum value of the first period and the second period as the current reference period of the input voltage.

17. The circuit connected to a phase-cut dimmer according to claim 16, wherein the controller is a micro control unit, wherein,
  determining the first period by the controller comprises:
  calculating the current first period according to a current capturing value of the two adjacent rising edges of the waveform through the micro control unit; and
  comparing the current first period and a power grid period, and when the current first period is in a normal range of the power grid period, taking the current first period as the first period; when the current first period is not in a normal range of the power grid period, taking the previous first period as the first period;
  determining, the second period by the controller comprises:
  calculating the current second period according to a current capturing value of the two adjacent falling edges of the waveform through the micro control unit; and
  comparing the current second period and the power grid period, and when the current second period is in a normal range of the power grid period, taking the current second period as the second period; when the current second period is not in a normal range of the power grid period, taking the previous second period as the second period.

18. The circuit connected to a phase-cut dimmer according to claim 11, wherein the phase-cut dimmer is a leading edge phase-cut dimmer or a trailing edge phase-cut dimmer.

19. The circuit connected to a phase-cut dimmer according to claim 18, wherein when the phase-cut dimmer is the leading edge phase-cut dimmer, the controller controls the bleeder by detecting a current flowing through the bleeder.

20. The circuit connected to a phase-cut dimmer according to claim 19, wherein controlling the bleeder by the controller by detecting a current flowing through the bleeder comprises:
  during a period when the input voltage is cut, the bleeder is controlled to be in a turn-on state, and the input voltage is zero, causing the current flowing through the bleeder to be zero; and
  when the input voltage is greater than zero and the current flowing through the bleeder detected to begin to be greater than zero, controlling to start a first timer, and turning off the bleeder after the first preset duration.

21. The circuit connected to a phase-cut dimmer according to claim 11, wherein the comparator and the controller are integrated into a micro control unit.

22. The circuit connected to a phase-cut dimmer according to claim 11, further comprising:
  a rectifier for rectifying a voltage after phase cutting by the phase-cut dimmer, and outputting the rectified voltage to the bleeder and the input voltage detector.

23. The circuit connected to a phase-cut dimmer according to claim 22, further comprising:
  a power converter for receiving a voltage outputted from the phase-cut dimmer and supplying power to a load;
  wherein the controller is further configured to determine a dimming signal according to the comparison signal, and the power converter receives the dimming signal and adjusts brightness of the load.

* * * * *